(12) United States Patent
Prakash et al.

(10) Patent No.: US 8,407,014 B2
(45) Date of Patent: Mar. 26, 2013

(54) AUTOMATIC SELECTION OF COLORANTS AND FLAKES FOR MATCHING COATING COLOR AND APPEARANCE

(75) Inventors: Arun Prakash, West Chester, PA (US); Judith Elaine Obetz, Newtown Square, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/070,817

(22) Filed: Feb. 21, 2008

(65) Prior Publication Data

US 2011/0246087 A1    Oct. 6, 2011

(51) Int. Cl.
*G01J 3/463*   (2006.01)
*G01J 3/465*   (2006.01)
(52) U.S. Cl. ............... 702/23; 356/402; 356/405
(58) Field of Classification Search ............ 356/402, 356/405; 702/23
See application file for complete search history.

(56) References Cited

U.S. PATENT DOCUMENTS

| | | | |
|---|---|---|---|
| 4,403,866 A * | 9/1983 | Falcoff et al. | 366/132 |
| 6,522,977 B2 * | 2/2003 | Corrigan et al. | 702/32 |
| 6,870,614 B2 * | 3/2005 | Graf et al. | 356/319 |
| 6,952,265 B2 * | 10/2005 | Prakash et al. | 356/445 |
| 7,145,656 B2 * | 12/2006 | Rodrigues et al. | 356/402 |
| 2001/0036309 A1 * | 11/2001 | Hirayama et al. | 382/167 |
| 2003/0071998 A1 * | 4/2003 | Krupka et al. | 356/402 |
| 2004/0218182 A1 * | 11/2004 | Alman et al. | 356/402 |
| 2005/0286053 A1 * | 12/2005 | Imura | 356/402 |

\* cited by examiner

*Primary Examiner* — Jonathan C Teixeira Moffat
*Assistant Examiner* — Regis Betsch
(74) *Attorney, Agent, or Firm* — Gann G. Xu

(57) ABSTRACT

The present invention is directed to a method for automatic selection of colorants and flakes to produce one or more matching formulas to match color and appearance of a target coating containing flakes. The present invention is further directed to a system for automatic selection of colorants and flakes for producing one or more matching formulas to match color and appearance of a target coating.

42 Claims, 11 Drawing Sheets

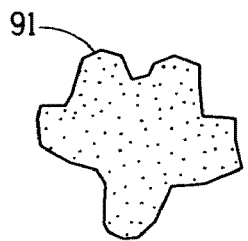
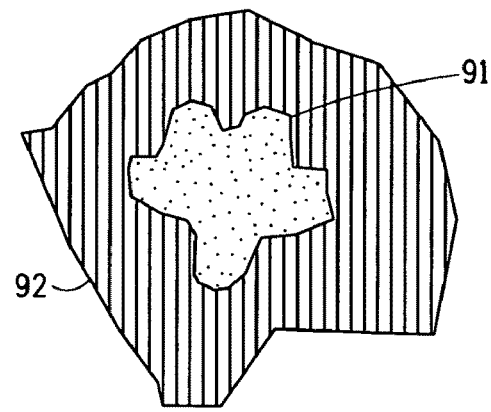
FIG. 9A  FIG. 9B
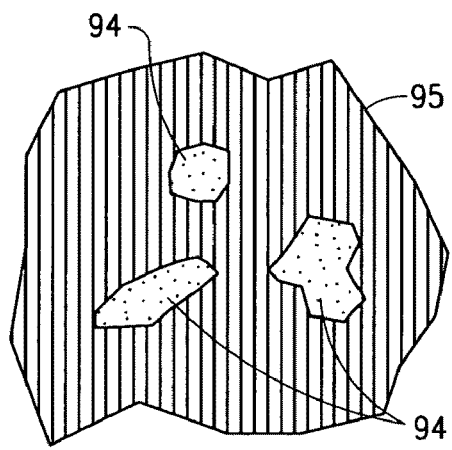
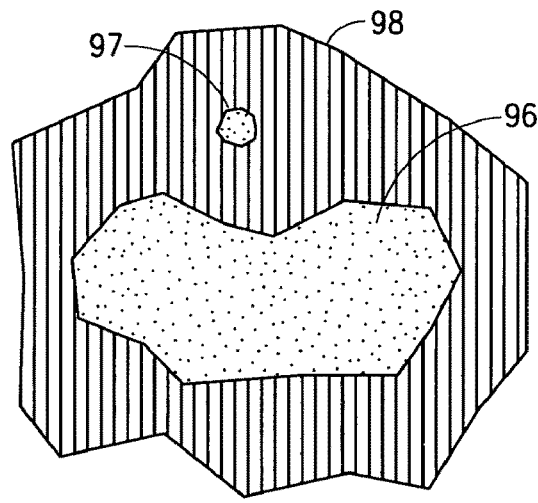
FIG. 9C  FIG. 9D
▭ Objects detectable at higher threshold level
▥ Objects detectable at lower threshold level

AUTOMATIC SELECTION OF COLORANTS AND FLAKES FOR MATCHING COATING COLOR AND APPEARANCE

FIELD OF INVENTION

The present invention is directed to a method for producing one or more matching formulas to match color and appearance of a target coating containing flakes. The present invention is further directed to a method for automatic selection of colorants and flakes for producing one or more matching formulas to match color and appearance of a target coating.

BACKGROUND OF INVENTION

Surface coatings containing effect pigments, such as light absorbing pigment, light scattering pigments, light interference pigments, and light reflecting pigments are well known. Flakes, such as metallic flakes, for example aluminum flakes, are examples of such effect pigments and are especially favored for the protection and decoration of automobile bodies, such as for example by reason of their imparting a differential light reflection effect, usually referred, to as "flop", as well as flake appearance effects, which include flake size distribution and the sparkle imparted by the flake as well as the enhancement of depth perception in the coating. The flake containing coatings usually also contain other pigments or colorants, generally of a light absorbing rather than a light scattering type. These light absorbing pigments interact with effect pigments such as flakes to change the appearance effect of the coating. In general, visual coating appearance includes texture, sparkle, glitter or other visual effects of a coating. The visual appearance can vary when viewed from varying viewing angles, with varying illumination angles, or with varying illumination intensities.

For repairing a previously coated substrate, for example, of an automotive body, it is necessary to choose the correct colorants or colorant combinations to match the color of that coated substrate as well as the correct effect pigments such as flakes to match the color and appearance of that coated substrate. Developments have been made to select colorants based on color measurement of a target coating. U.S. Patent Publication 2006/0181707, filed on May 6, 2004 with a U.S. application Ser. No. 10/552,200, described a computer implemented method to select colorants or colorant combinations to match the color of a coating on a coated auto body. Selection of effect pigments, such as flakes, however, is traditionally done manually by an experienced shader, based on their expertise. Once the flakes have been selected, the flakes are added into a formulation algorithm producing one or more preliminary matching formulas. One or more test coatings are then prepared based on the preliminary matching formulas and sprayed on test panels, which are then visually compared to the target coating. If the appearance such as flop and/or sparkle match are deemed unsatisfactory, the shader adjusts the type and/or changes the amount of the flakes entered into the algorithm to get new color/flop matching formulas and the whole cycle is repeated until an adequate match is achieved in both color and appearance at all angles of illumination and view. This traditional approach, however, requires repeated spraying and visually comparing test panels with the target coating.

A need exists, therefore, for a method for automatic selection of colorants and effect pigments such as flakes to produce one or more matching formulas wherein match coatings resulted from said matching formulas closely match both the color and appearance of the target coating.

STATEMENT OF INVENTION

This invention is directed to a method for producing one or more matching formulas for matching color and appearance of a target coating containing flakes, said method comprising the steps of:
a) obtaining appearance data of the target coating;
b) comparing the appearance data to appearance characteristics of known flakes stored in a flake database;
c) selecting from the flake database, one or more match flakes, flake combinations or flake ratios that have appearance characteristics matching said appearance data;
d) obtaining color data of the target coating;
e) selecting from a color database, one or more colorant combinations of known colorants, wherein said colorant combinations have color characteristics matching said color data;
f) determining colorant concentrations of each known colorant of said colorant combinations and flake concentrations of each of the match flakes, flake combinations or flake ratios;
g) producing said one or more matching formulas according to said colorant concentrations and said flake concentrations, and optionally balancing said colorant concentrations and said flake concentrations to allow for the presence of non-colorant and non-flake components, wherein match coatings resulted from said matching formulas have color characteristics matching the color data and appearance characteristics matching the appearance data.

This invention is also directed to a system for producing one or more matching formulas for matching color and appearance of a target coating containing flakes, said system comprising:
a) a color measurement device for obtaining color data of the target coating;
b) an appearance measurement device for obtaining appearance data of the target coating;
c) a computing device comprising a processor and a memory member;
d) a color database containing known colorants associated with color characteristics, wherein the color database is accessible from the computing device;
e) a flake database containing known flakes associated with appearance characteristics, wherein the flake database is accessible from the computing device; and
f) one or more computing program products operatively residing in the memory member that causes the computing device to perform a computing process comprising the steps of:
i) receiving said color data and said appearance data;
ii) comparing the appearance data to appearance characteristics of known flakes stored in the flake database;
iii) selecting from the flake database, one or more match flakes, flake combinations or flake ratios that have appearance characteristics matching the appearance data;
iv) selecting from the color database, one or more colorant combinations of known colorants, wherein said colorant combinations have color characteristics matching said color data;

v) determining colorant concentrations of each known colorant of said colorant combinations and flake concentrations of each of the match flakes, flake combinations or flake ratios;

vi) producing said one or more matching formulas according to said colorant concentrations and said flake concentrations, and optionally balancing said colorant concentrations and said flake concentrations to allow for the presence of non-colorant and non-flake components, wherein match coatings resulted from said matching formulas have color characteristics matching the color data and appearance characteristics matching the appearance data.

This invention is further directed to a system for producing one or more matching formulas for matching color and appearance of a target coating containing flakes, said system comprising:

a) a color measurement device for obtaining color data of the target coating;

b) an imaging device for obtaining one or more target images of the target coating;

c) a computing device comprising a processor and a memory member;

d) a color database containing known colorants associated with color characteristics, wherein the color database is accessible from the computing device;

e) a flake database containing known flakes associated with appearance characteristics, wherein the flake database is accessible from the computing device; and f) one or more computing program products operatively residing in the memory member that causes the computing device to perform a computing process comprising the steps of:

i) receiving the color data and the target images;

ii) measuring appearance characteristics of the target coating from said target images to generate appearance data;

iii) comparing the appearance data to appearance characteristics of known flakes stored in the flake database;

iv) selecting from the flake database, one or more match flakes, flake combinations or flake ratios that have appearance characteristics matching the appearance data;

v) selecting from the color database, one or more colorant combinations of known colorants, wherein said colorant combinations have color characteristics matching said color data;

vi) determining colorant concentrations of each known colorant of said colorant combinations and flake concentrations of each of the match flakes, flake combinations or flake ratios;

vii) producing said one or more matching formulas according to said colorant concentrations and said flake concentrations, and optionally balancing said colorant concentrations and said flake concentrations to allow for the presence of non-colorant and non-flake components, wherein match coatings resulted from said matching formulas have color characteristics matching the color data and appearance characteristics matching the appearance data.

BRIEF DESCRIPTION OF DRAWING

FIG. 9 shows representations of coating regions having detectable features at different threshold levels.

DETAILED DESCRIPTION OF PREFERRED EMBODIMENT

Figure 1A:
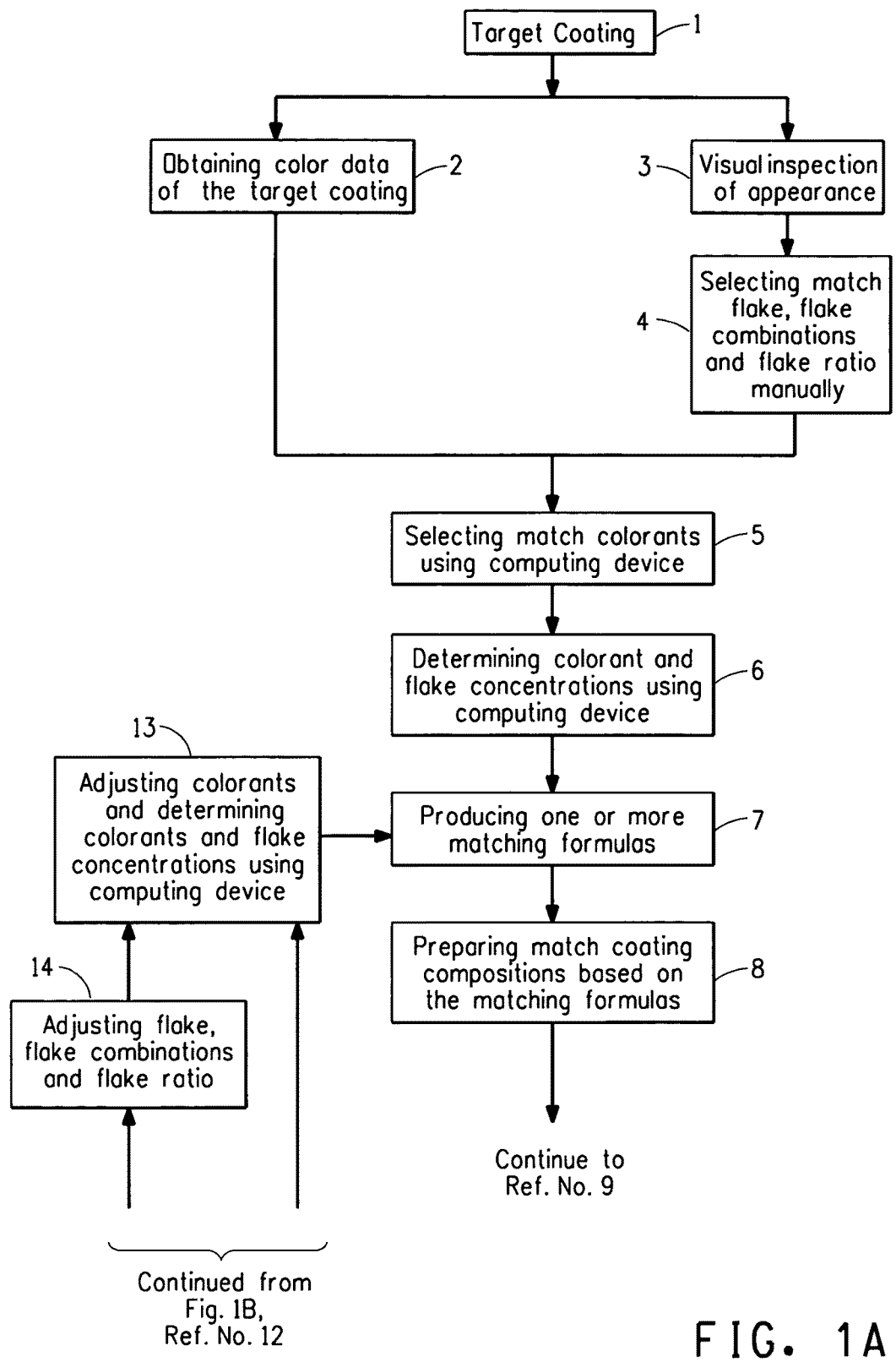
FIG. 1 is a flow chart for a traditional method for producing matching formulas to match the color and appearance of a target coating.

The aspects and advantages of the present invention will be more readily understood, by those of ordinary skill in the art, from reading the following detailed description. It is to be appreciated that certain aspects of the invention, which are, for clarity, described above and below in the context of separate embodiments, may also be provided in combination in a single embodiment. Conversely, various aspects of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "pigment" or "pigments" used herein refers to a colorant or colorants that produce color or colors. A pigment can be from natural and synthetic sources and made of organic or inorganic constituents. A pigment also includes metallic particles or flakes with specific or mixed shapes and dimensions. A pigment is usually not soluble in a coating composition.

The term "effect pigment" or "effect pigments" refers to pigments that produce special effects in a coating. Examples of effect pigments include, but not limited to, light scattering pigments, light interference pigments, and light reflecting pigments. Flakes, such as metallic flakes, for example aluminum flakes, are examples of such effect pigments.

Gonioapparent flakes refer to flakes which change color or appearance, or a combination thereof, with change in illumination angle or viewing angle. Metallic flakes, such as aluminum flakes are examples of gonioapparent flakes.

The term "dye" means a colorant or colorants that produce color or colors. Dye is usually soluble in a coating composition.

"Appearance" used herein refers to (1) the aspect of visual experience by which a coating is viewed or recognized; and (2) perception in which the spectral and geometric aspects of a coating is integrated with its illuminating and viewing environment. In general, appearance includes texture, sparkle, or other visual effects of a coating, especially when viewed from varying viewing angles and/or with varying illumination angles.

The term "database" refers to a collection of related information that can be searched and retrieved. The database can be a searchable electronic numerical, alphanumerical or textual document; a searchable PDF document; a Microsoft Excel® spreadsheet; a Microsoft Access® database (both supplied by Microsoft Corporation of Redmond, Wash.); an Oracle® database (supplied by Oracle Corporation of Redwood Shores, Calif.); or a Linux database, each registered under their respective trademarks. The database can be a set of electronic documents, photographs, images, diagrams, or drawings, residing in a computer readable storage media that can be searched and retrieved. A database can be a single database or a set of related databases or a group of unrelated databases. "Related database" means that there is at least one common information element in the related databases that can be used to relate such databases. One example of the related databases can be Oracle® relational databases.

The term "vehicle", "automotive", "automobile", "automotive vehicle", or "automobile vehicle" refers to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

A computing device used herein refers to a desktop computer, a laptop computer, a pocket PC, a personal digital assistant (PDA), a handheld electronic processing device, a smart phone that combines the functionality of a PDA and a mobile phone, or any other electronic devices that can process information automatically. A computing device may have a wired or wireless connection to a database or to another computing device. A computing device may be a client computer that communicates with a host computer in a multi-computer client-host system connected via a wired or wireless network including intranet and internet. A computing device can also be configured to be coupled with a data input or output device via wired or wireless connections (110). For example, a laptop computer can be operatively configured to receive color data and images through a wireless connection. A computing device may further be a subunit of another device. Examples of such a subunit can be a processing chip in an imaging device, a spectrophotometer, or a goniospectrophotometer. A computing device may be connected to a display device, such as a monitor screen. However, the display device is not necessary. A "portable computing device" includes a laptop computer, a pocket PC, a personal digital assistant (PDA), a handheld electronic processing device, a mobile phone, a smart phone that combines the functionality of a PDA and a mobile phone, a tablet computer, or any other stand alone or subunit devices that can process information and data and can be carried by a person.

Wired connections include hardware couplings, splitters, connectors, cables or wires. Wireless connections and devices include, but not limited to, Wi-Fi device, Bluetooth device, wide area network (WAN) wireless device, Wi-Max device, local area network (LAN) device, 3G broadband device, infrared communication device, optical data transfer device, radio transmitter and optionally receiver, wireless phone, wireless phone adaptor card, or any other devices that can transmit signals in a wide range of electromagnetic wavelengths including radio frequency, microwave frequency, visible or invisible wavelengths.

An imaging device refers to a device that can capture images under a wide range of electromagnetic wavelengths including visible or invisible wavelengths. Examples of the imaging device include, but not limited to, a still film optical camera, a digital camera, an X-Ray camera, an infrared camera, an analog video camera, and a digital video camera. A digital imager or digital imaging device refers to an imaging device captures images in digital signals. Examples of the digital imager include, but not limited to, a digital still camera, a digital video camera, a digital scanner, and a charge coupled device (CCD) camera. An imaging device can capture images in black and white, gray scale, or various color levels. A digital imager is preferred in this invention. Images captured using a non-digital imaging device, such as a still photograph, can be converted into digital images using a digital scanner and can be also suitable for this invention. The imaging device can further comprise an illumination device.

An illumination device for providing illuminations typically includes a light source, such as, the IT3900 with a tungsten-halogen lamp EKE supplied by Illumination Technologies Inc., East Syracuse, N.Y. and a fiber optic bundle A08025.60 supplied by Schott Fostec Inc., Auburn, N.Y. that is capable of producing beams of illumination in the visible light range of from 400 nanometers to 700 nanometers at set intensities. The system, which is preferably portable, is preferably provided with an enclosed extension to house the light source. Other illumination devices, such as the MHF-C50LR light source with an LM-50 lamp and a fiber optic bundle connected to a MML4-45D micro machine lens system, supplied by Moritex USA Inc., San Jose, Calif. to pipe-in the illumination beams from the light source, are also suitable. The means for selecting an effective illumination intensity can be any conventional means, such as a voltage regulator that can change the current to the filament of the light source. The illumination intensity can be controlled in accordance with a conventional software program run from a computer to achieve the preset intensities. The computer used here to control the illumination intensity can be the same aforementioned computing device for receiving the image or a separate computer. Any suitable computer can be used, such as, for example, Dell Precision M50 model supplied by Dell Computer Corp., Round Rock, Tex. If desired, the system may comprise additional means such as a collimating lens or an aperture, for collimating the one or more beams of light emanating from light source as determined necessary by those skilled in the art. The illumination device may further provide modulations of illumination angles. The illumination device can also be part of the imaging device.

Figure 1B:
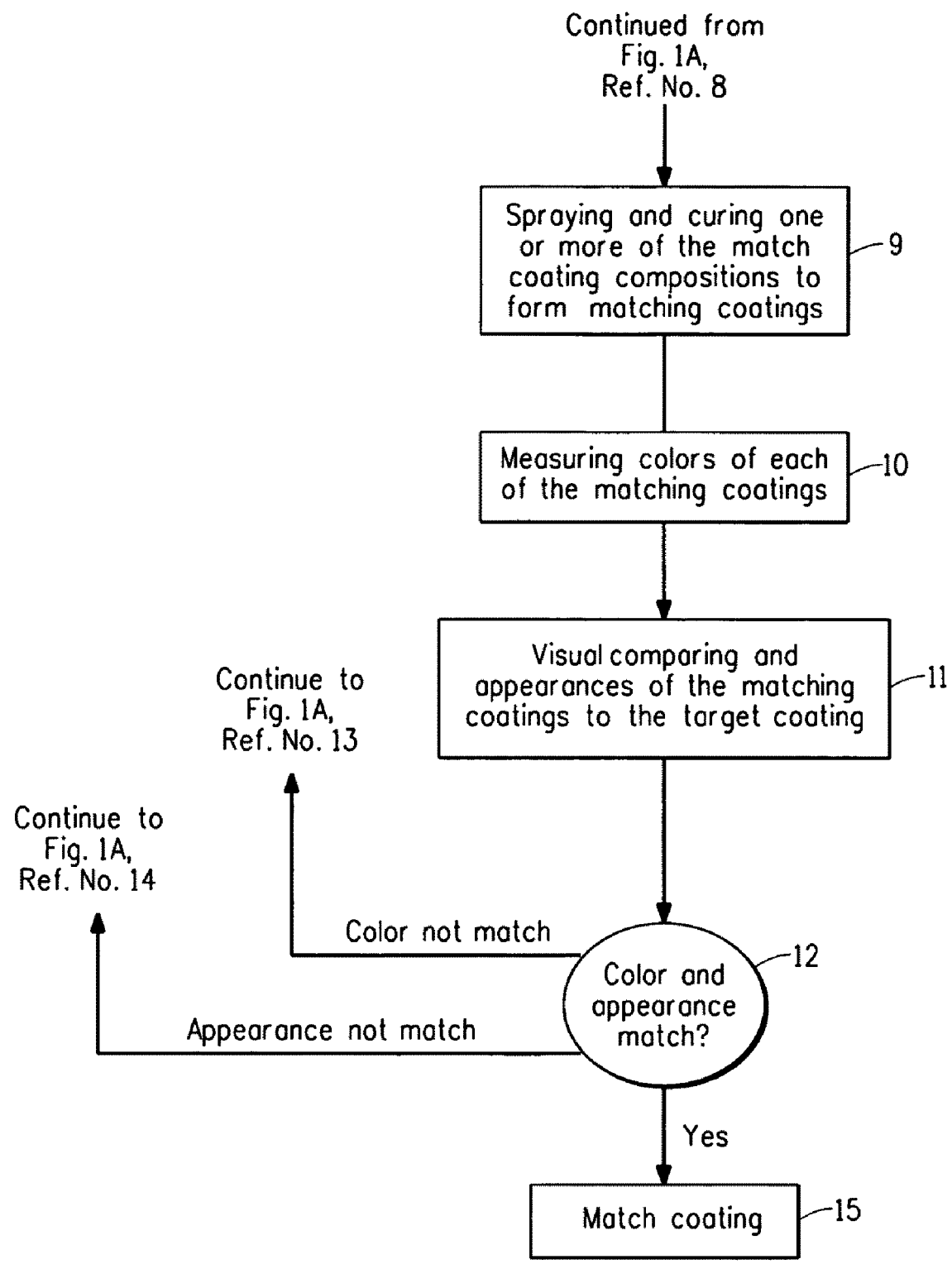

FIG. 1 outlines a typical traditional workflow for matching color and appearance of a target coating 1. To match color, color data of the target coating are obtained in the step 2. Color data can be obtained as reflectance data, $L^*$, $a^*$, $b^*$ or L, C, h values, or spectral data provided by a color measuring device such as a spectrophotometer. Color data can also be obtained by importing into the computing device from digital data files containing required color data. In this typical traditional process, appearance data of the target coating is obtained by visual inspection (step 3) of the target coating and appearance match is done manually by one or more experienced shaders, based on their expertise to identify the presence or absence of any effect pigments such as flakes, wherein said target coating can be a previously coated substrate of an automotive body. If one or more effect pigments such as flakes are present in the target coating, the shaders manually select, in step 4, one or more flakes, flake combinations, or flake ratios from a set of known flakes that may potentially match appearance of the target coating.

Color match can be done automatically based on color data using a computing device and well developed color matching algorithms operatively residing in the computing device. One example of such color matching algorithm is described in detail in aforementioned U.S. Patent Publication 2006/0181707, herein incorporated by reference. Since the presence of flakes affects colorants selection, the color data and the selected flakes, flake combinations or flake ratios are entered into the color matching algorithm in step 5 to select match colorants. Concentrations of each of the colorants and flakes are determined in step 6 by the algorithm. One or more matching formulas are then produced in step 7 based on the concentrations of the colorants and the flakes. If necessary, concentrations of the colorants and the flakes are balanced to allow for the presence of non-colorant and non-flake components. Examples of non-colorant or non-flake components include, but not limited to, binder polymers, solvents, additives such as UV screeners, light stabilizers, rheology control agents, flow agents, adhesion promoters, catalysts, and other materials determined necessary for the coating by those who are skilled in the art. Some or all of the non-colorant or non-flake components can also be pre-balanced with all necessary materials determined by those who are skilled in the art. Preliminary matching coating compositions are then prepared in step 8 based on the matching formulas and sprayed on test panels to form preliminary match coatings in step 9. The color of each of the preliminary match coatings is typically measured using an aforementioned color measuring device in step 10. The color and appearance of those preliminary match coatings are then visually compared to the target coating in step 11. If the color match is deemed not satisfactory (12), the shader adjusts colorants and new colorant and flake concentrations are computed in step 13. The color measurement data of the preliminary match coatings obtained in step 10 can be used to assist the adjustment of colorants. New matching formulas are then produced (step 7) and the whole cycle is repeated. If the appearance such as flop and/or sparkle match are deemed unsatisfactory, the shader adjusts the type and/or changes the amount of the flakes in step 14 and enters the new flake selection into the algorithm to calculate new colorants and flake concentrations in step 13. A set of new matching formulas are then produced and the steps of 7 through 12 are repeated until one or more match coatings having adequate match in both color and appearance (15) are obtained. It is acceptable in the industry that color and appearance may be achieved at all or some predetermined angles of illumination or view. This traditional approach, however, requires repeated spraying and visually comparing test panels with the target coating.

This invention is directed to a method for automatic selection of match flakes for producing one or more matching formulas for matching both color and appearance of a target coating containing flakes. This invention improves the typical traditional workflow reducing the need for repeated spraying and visually comparing the test panels.

Figure 2:
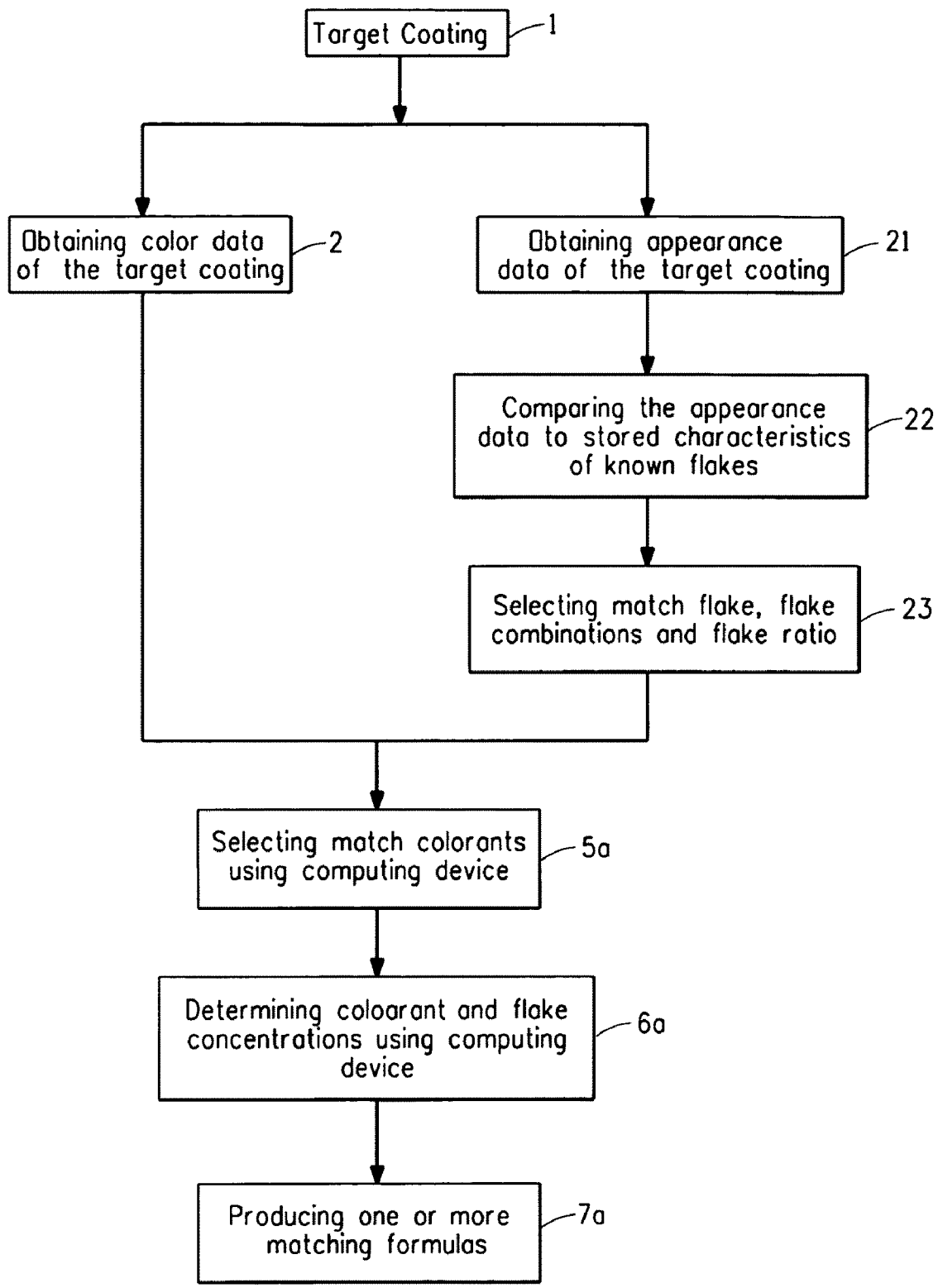
FIG. 2 is a first representative flow chart of the method of this invention.

FIG. 2 outlines a first representative flow chart of this invention. Color data of the target coating can be obtained in step 2 in the same way as the aforementioned traditional process. In this embodiment of the invention, appearance data can be obtained in step 21 using an appearance measurement device. The appearance data are then compared with stored appearance characteristics of known flakes in step 22 in a flake database. One or more known flakes, flake combinations or flake ratios are automatically selected in step 23 so that the appearance characteristics of the selected flakes, flake combinations or flake ratios match the appearance data. The selected flakes, flake combinations or flake ratios are then entered into the color matching algorithm to select match colorants in step 5a. Concentrations of each of the colorants and flakes are determined by the algorithm in step 6a. One or more matching formulas are then produced in step 7a based on the concentrations of the colorants and the flakes. If necessary, concentrations of the colorants and the flakes can be balanced to compensate for the presence of non-colorant and non-flake components. If desired, preliminary matching coating compositions can be prepared based on the matching formulas and test sprayed to form match coatings and compared according to steps 8-15 shown in FIG. 1. Steps 21-23 in FIG. 2 ensure that accurate appearance data are obtained without the need for visual inspection by one or more experienced shaders based on their expertise. In addition, the appearance data are compared with stored appearance characteristics of known flakes in a flake database resulting in better appearance match. With this invention, fewer matching formulas are produced and fewer test sprays are needed resulting in improved productivity and shortened time needed for obtaining acceptable match coatings.

Figure 3:
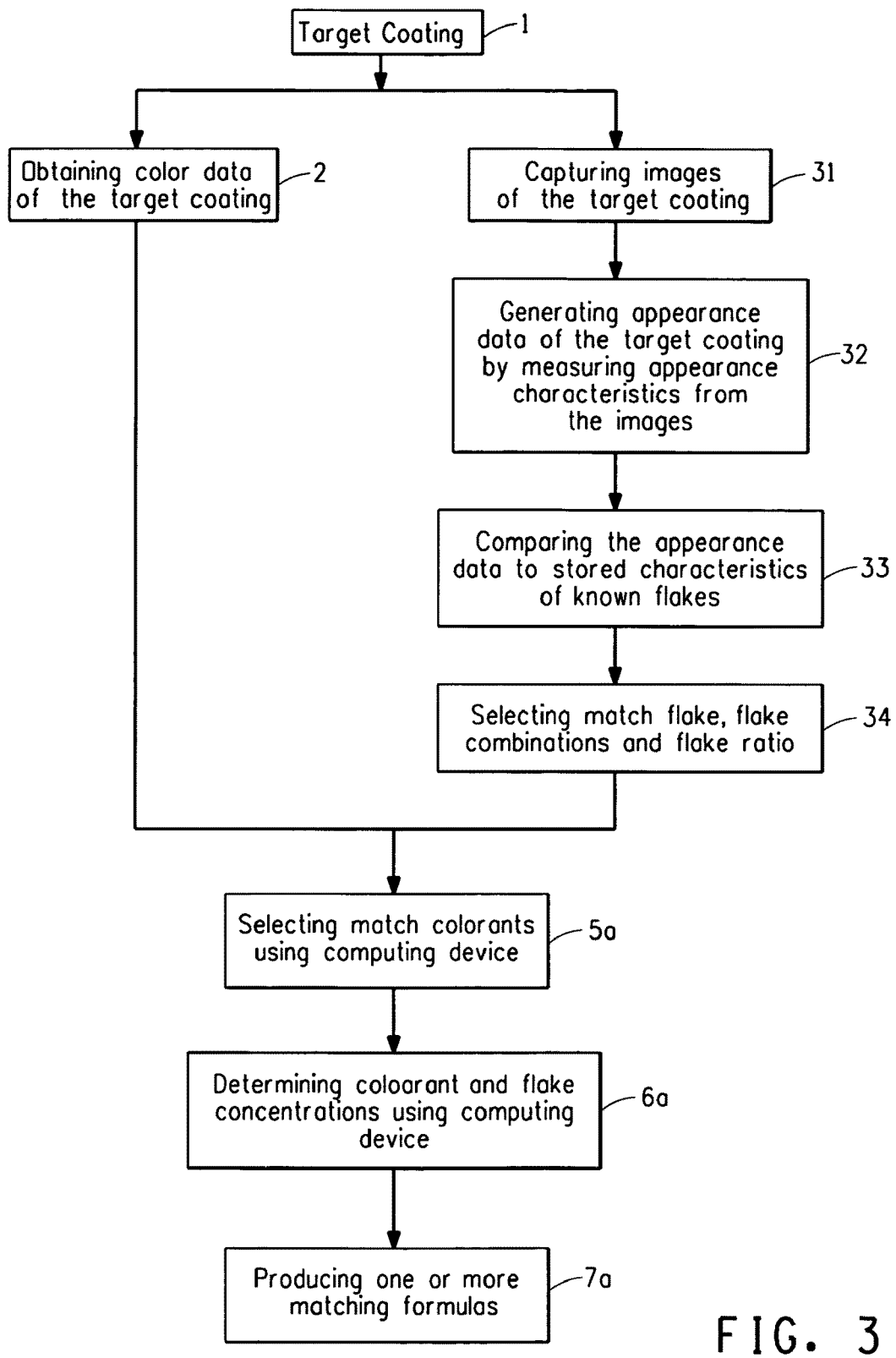
FIG. 3 is a second representative flow chart of the method of this invention.

In a second representative flow chart of this invention outlined in FIG. 3, the appearance data can be obtained by capturing one or more target images using an imaging device and subsequent measurement of the target images using a computing device. The target images can be still images or video images. Both still images and video images are suitable for this invention. The target images, either still or video images can be stored in digital formats for measurement of appearance characteristics at the same time or at a different time. The target images can also be captured and transmitted to a computing device for measurement of appearance without being stored permanently, such as real-time video images without being stored. In this invention, stored images are preferred. The appearance data can also be generated by an appearance measurement device and stored as non-image electronic files. Examples of such non-image electronic files include, but not limited to, numerical, textual or alphanumerical data files correlating positions and appearance data at each of the positions. Image and non-image data files can be converted to each other according to well known methods. For example, an image can be measured using methods described below and stored into a separate non-image data files.

In one embodiment, appearance data of a target coating containing flakes can be obtained as described below.

Illuminations at a fixed illumination angle and at varying illumination intensities are directed to the target coating. The fixed illumination angle can be at a perpendicular (0°), also known as normal (0°) angle to the surface of the target coating, or an angle within the range from −5° to +5° from the normal. Image capture is also at the normal angle. Illumination intensity is in such a range that within the captured image, sparkles caused by the flakes are brighter than other target coating areas where no flakes are visible. The flakes in the target coating exhibit varying brightness or sparkles under varying illumination intensities.

Then, an illumination intensity setting is selected so that the brightest parts of the image are at or close to a maximum image intensity level while at the same time objects at lower image intensities are still visible in the image. The selected illumination intensity is referred to as an effective illumination intensity. A commonly used imaging device stores digital images with image intensity levels ranging from 0 to 255 wherein 0 represents the darkest and 255 represents brightest parts of an image. When such commonly used imaging device is used, the maximum image intensity level is 255. This range comes from the 8 bits data format used to represent the data of any one pixel in the digital image. When other data formats are used, image intensity levels may change. Those skilled in the art can select any workable data formats, image intensities and illumination intensities without departing away from the spirit and scope of this invention.

At least one image of the target coating under the effective illumination intensity is captured using the aforementioned imaging device. An imaging device refers to a device that can capture images under a wide range of electromagnetic wavelengths including visible or invisible wavelengths. Preferred imaging device is a digital still camera, a digital video camera, a digital scanner, or a charge coupled device (CCD) camera. An imaging device can capture images in black and white, gray scale, or various color levels.

The image captured by the imaging device can be stored in one of the commonly used digital image file formats, such as, but not limited to ".bmp" (Windows Bitmap), ".tif" or ".tiff" (Tagged Image File Format), ".jpg" or ".jpeg" (Joint Photographic Experts Group image file format), ".gif" (Graphics Interchange Format), or ".wmf" (Windows Metafile format). The images can also be captured in analog format and converted into digital format by methods well known to those skilled in the art. The images can also be analog or digital video images. The images can be entered into a computing device through a wired or wireless connection (110).

The image is then measured by the computing device to identify appearance features. An appearance feature is a characteristic or attribute that contributes to the visual appearance of a coating. An appearance feature can be identified and localized as a sparkle object, a flake or a flake-like object, a physical distance between two adjacent objects, a region where one or more objects reside, a region having multiple objects, or a combination thereof. A feature can also be a characteristic or attribute such as distribution of intensities, variation of intensities, or other statistical descriptions of the coating appearance. Appearance features can be quantitative or qualitative descriptions of the appearance of the coating. Quantitative descriptions, such as size, brightness, or other descriptions with numeric values are preferred. In one example, appearance features can comprise a set of bright features from bright areas of said image where the effect pigments such as metallic flakes exhibit highest brightness, a set of intermediate features from intermediate areas of the image where the effect pigments exhibit intermediate brightness, and a set of dark features from dark areas of the image where the target coating is essentially free of detectable said effect pigments.

Figure 4:
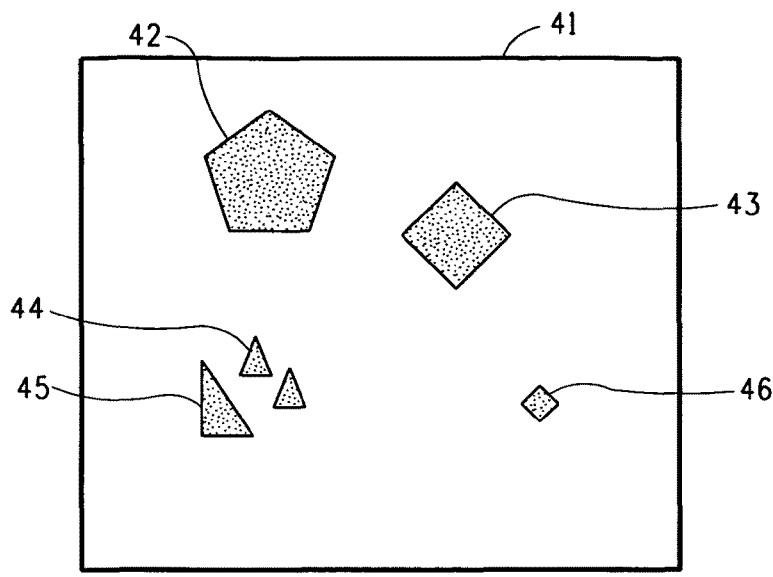
FIG. 4 is a schematic representation of bright features detectable above a first threshold level T1.
Figure 5:
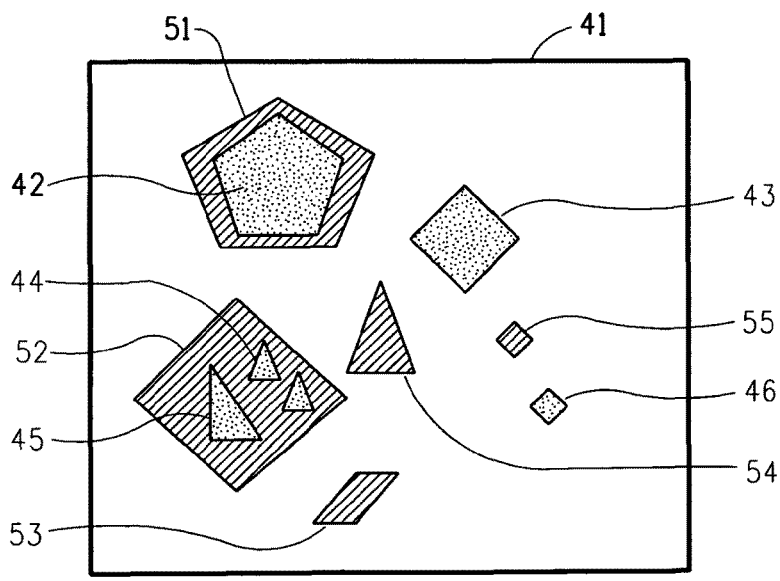
FIG. 5 is a schematic representation of bright and intermediate features detectable above a second threshold level T2.
Figure 6:
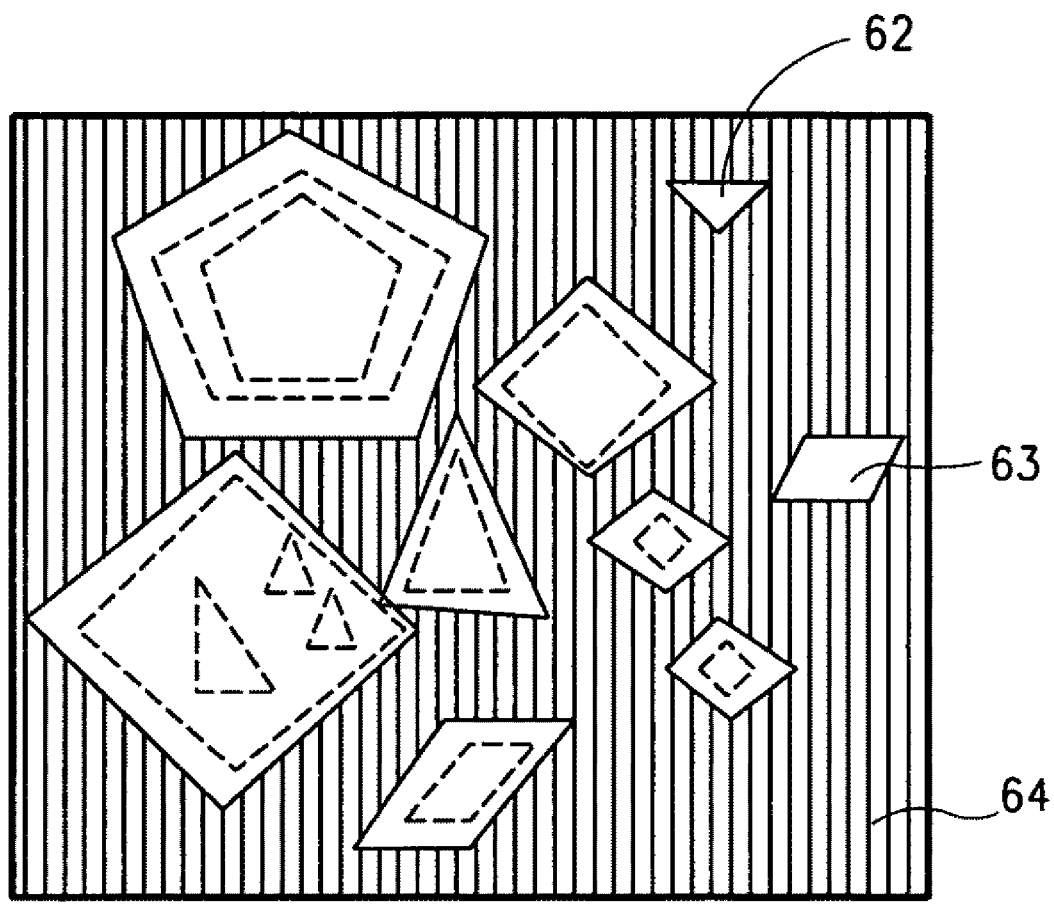
FIG. 6 is a schematic representation of features detectable above a third threshold level T3. The crosshatched area represents dark features having image intensity below the threshold levels T3. Dotted lines represent boundaries of features detectable above T1 or T2 threshold levels.
Figure 7:
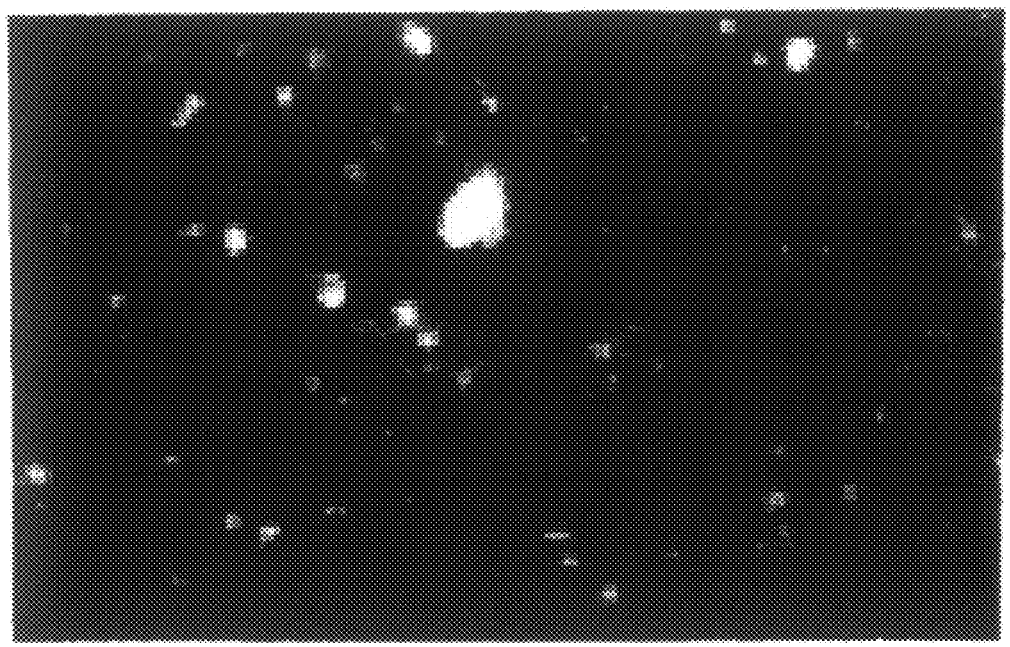
FIG. 7 is a representative coating image in gray scale.
Figure 8A:
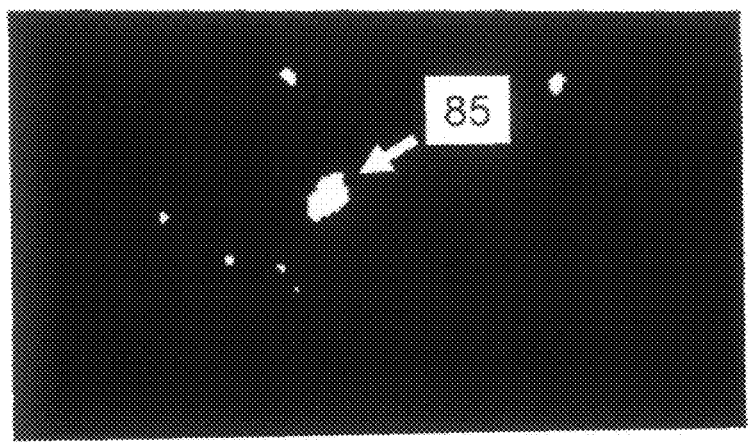
FIG. 8 shows the coating image of FIG. 7 at three different threshold levels. A: image showing bright features of different sizes above threshold level T1; B: same image above the threshold level T2; and C: same image at the threshold level T3.
Figure 8B:
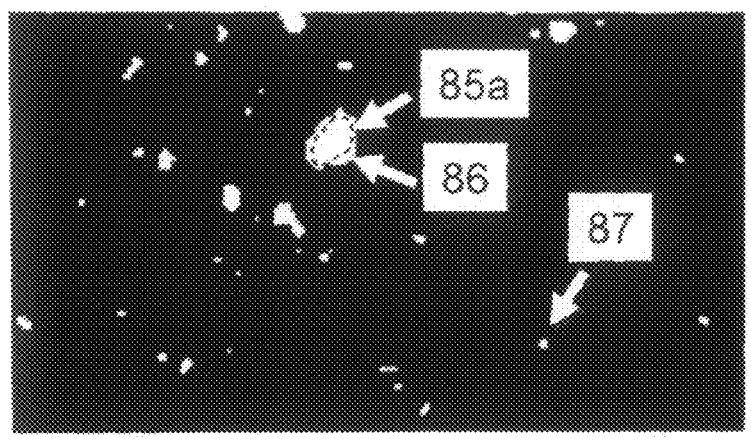
Figure 8C:
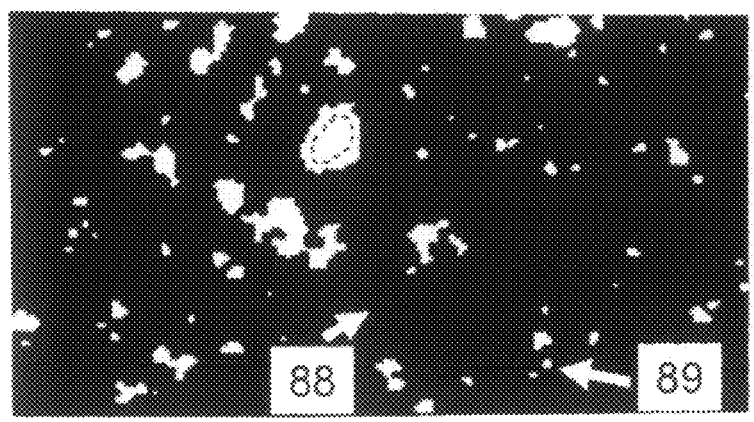

Measurement can be done by setting different threshold levels wherein a threshold level used herein refers to an image intensity level where any pixels having the image intensity level equal or greater than the threshold level will be measured. For example, a threshold level T1 of 225 can be set for bright areas meaning that pixels or regions of pixels of the image having image intensity equal or greater than 225 will be identified as bright features, such as objects 42-46 in the area 41 of FIG. 4 or object 85 in FIG. 8A. A second threshold level T2 can be set at 150 for intermediate brightness. Objects having image intensity equal or greater than 150 can be identified as intermediate features, such as objects 51-55 in FIG. 5 or objects 86 and 87 in FIG. 8B. A threshold level T3 of 100 can be set for dark features meaning that pixels or regions of pixels of the image having image intensity below 100 will be identified as dark features, such as area 64 in FIG. 6 or area 88 in FIG. 8C where essentially no flakes or flake-like objects are detectable. Some other objects, such as objects 62 and 63 in FIG. 6 or object 89 in FIG. 8C that have image intensities below the threshold level T2, but above T3 can be identified and considered when generating dark feature values.

Individual feature values are generated for individual appearance features identified as described above. A number of feature values can be generated based on features identified. Examples of feature values include: (1) Total number of distinct and contiguous sparkle objects having image intensity equal or greater than a set first threshold level T1; (2) Average number of small sparkle objects measured in each of the images; (3) Average number of medium sparkle objects measured in each of the images; (4) Average number of large sparkle objects measured in each of the images; (5) Average number of extra large sparkle objects measured in each of the images; (6) Fractional area of each image having image intensities above the set first threshold level (Area T1); (7) The number of sparkle objects where the size of the sparkle object is expanded at a second Threshold Level T2, such as objects 51 and 52 in FIG. 5; (8) Average number of new sparkle objects wherein a new sparkle object is a contiguous area that is distinct at the second Threshold Level T2, such as objects 53, 54 and 55 in FIG. 5; (9) Fractional area of each image having image intensities greater than the second threshold level T2; (10) Fractional area of each image having sparkle objects expanded at the second Threshold Level T2 comparing to that at the first Threshold Level T1 (Area Exp); (11) Fractional area of each image having new sparkle objects at the second Threshold Level T2 (Area New); and (12) Fractional area of each image having image intensities below a third threshold level T3, such as the area 64 in FIG. 6. Additional features can be identified and additional feature values can be generated as determined necessary by those skilled in the art. Examples of such additional features include objects 62 and 63 in FIG. 6 that have image intensity between T2 and T3.

Appearance characteristics can be generated based on the individual feature values generated. Examples of such appearance characteristics include such ratios of Area Exp/Area T1 and Area New/Area T1. These ratios are related to physical properties of flakes in the coating and contribute to the appearance of the target coating. Other appearance characteristics may be generated as determined necessary by those skilled in the art.

In a second embodiment, appearance data of a target coating containing flakes can be obtained with a process described in detail in the U.S. Pat. No. 6,952,265, said process is briefly described below. First, one or more beams of illumination at a preset intensity is directed towards the target coating. The beams can be directed at a perpendicular (0°), also known as normal (0°) angle to the surface of target coating, or an angle within the range from −5° to +5° from the normal. Preferably, one or more beams of illumination are directed sequentially at plurality of preset intensities, preferably at at least two, and more preferably at least three preset intensities. Then, a reflection of the target coating is directed to an imaging device to capture a target image in color or preferably in gray scale, of the target coating. Preferably, one or more reflections of the target coating are directed sequentially at plurality of other preset intensities to the imaging device.

The target images captured can be transmitted to a computing device, such as a computer, or a portable computer. Appearance data of the target coating can be generated by the computing device by measuring appearance characteristics from the images. One measurement suitable for generating said appearance data is described in aforementioned U.S. Pat. No. 6,952,265 with the following steps:

(a) scanning the target images at first of the preset intensities and at first of threshold levels;

(b) locating regions of pixels recognizable above the first threshold level in the target images at the first of the preset intensities;

(c) scanning the target images at the first of the preset intensities and at subsequent said threshold levels;

(d) locating new regions of pixels recognizable above the subsequent threshold levels in the target images at the first of preset intensities;

(e) locating coincident regions of pixels recognizable above the subsequent threshold level that incorporate the regions of pixels recognizable above the first threshold level located in said step (b);

(f) adding number of the new and coincident regions of pixels of preset sizes located in said steps (d) and (e) to record a final number of the preset sizes of regions of pixels recognizable above the threshold levels at the first of preset intensities. A feature in this embodiment can be a characteristic or attribute, such as a flake or a flake-like object visible at one or more threshold levels, a physical distance between two adjacent objects, or a region having multiple objects. The final number of the pre-set sizes of regions is referred to as a feature value; and (g) repeating said steps (a), (b), (c), (d), (e), and (f) at subsequent preset intensities.

In the foregoing steps (a) through (g), several decisions can be made on the basis of preset criteria. One example is shown in FIG. 9. In step (a), when the target image at first of the preset intensities and at first of threshold levels is scanned, i.e., at the highest threshold level, only regions of pixels representing flakes having most prominent visible features would be located. The location and size, in accordance with the preset criteria of sizes, such a region is recorded as a new flake (91) shown in FIG. 9A. When the same target image is scanned in step (c) at a lower threshold level, it is possible that new regions of pixels could become recognizable above the lower threshold level in the target image at the first of preset intensities. Thus, a previously located region recorded as new flake (91) may appear larger once its additional features (92) are located at the lower threshold level (FIG. 9B). The foregoing coincident regions include single contiguous regions of pixels recognizable above the first threshold level that are enveloped within single regions of pixels recognizable above said lower threshold level. Under such a scenario the previously located and recorded size of the flake is discarded and the new larger size is recorded in its place.

Alternatively, the foregoing coincident regions can also include plurality of regions of pixels recognizable above the first threshold level that are merged within regions of pixels recognizable above the lower threshold level. Thus, a cluster of small regions (94), which were previously located and recorded as new flakes of small size, when analyzed at a lower threshold level can be part of a larger flake (95) (FIG. 9C). Under such a scenario, the previously located and recorded size of these small regions is discarded and a new larger region is located and recorded in their place.

In yet another scenario, at the first threshold level, a large region (96) could be located adjacent to a small region (97), both of which would be located and recorded. However, the same combination, when viewed at a lower threshold level can become part of a new larger region (98) (FIG. 9D). Under such a scenario, the previously located and recorded sizes of these large (96) and small (97) regions are kept and the new larger region (98) is discarded, since the new larger region is likely to be a result of multiple flakes appearing as one merged flake, which should not, therefore, be counted as one large flake but should be counted as two distinct regions, namely the large region (96) and the small region (97). In addition to the foregoing, it is possible that a region not recorded at all at the first threshold (the highest threshold) could appear at the lower threshold, which would also be located and recoded at that threshold level. Moreover, it would be apparent that any regions having no changes to their size even at lower threshold levels would be also located and recorded without change. The same process is repeated at other preset intensities.

By locating and recording the number of flakes from the target images at different thresholds and multiple illumination levels, said measurement method generates appearance data including a plurality of target features and corresponding target feature values that reflect sizes of the flakes in the target coating at pre-set illumination intensities. Although a target coating having flakes as effect pigments are specifically described, the above mentioned method is also suitable for coatings containing other effect pigments.

In another embodiment, one or more images of the target coating can be captured with a process comprising the steps of:

i) sequentially providing directional illuminations to the target coating at two or more illumination angles and at one or more preset intensities;

ii) directing a reflection of each of said illuminations from said target coating to an imaging device to sequentially capture one or more target images of said target coating.

In yet another embodiment, one or more images of the target coating can also be captured with a fourth process comprising the steps of:

i) sequentially providing diffused illuminations to the target coating at one or more preset intensities;

ii) directing a reflection of each of said illuminations from said target coating to an imaging device to sequentially capture one or more target images of said target coating.

In a further embodiment, one or more images of the target coating can be captured with a fifth process comprising the steps of:

i) sequentially providing a combination of directional and diffused illuminations to the target coating at one or more illumination angles and at one or more preset intensities;

ii) directing a reflection of each of said illuminations from said target coating to an imaging device to sequentially capture one or more target images of said target coating.

In an even further embodiment, appearance data can be generated without capturing target images. It can be done by detecting the reflectance of the target coating and directly recording in a non-image data file such as a set binary data files, or other non-image data files that can record appearance information. Any aforementioned digital imaging devices can be configured directly or through a converter to generate non-image data file, such as a binary data file. An image recorded by an analog imaging device such as a photograph captured by a still film camera, can be converted into a digital image, or a non-image data file by, for example, a scanner.

Appearance characteristics of a number of known flakes stored in a flake database can be generated by first preparing paint panels coated with individual benchmarking coatings described in aforementioned U.S. Pat. No. 6,952,265, wherein relevant sections from line 52, column 12 through line 49, column 13 of said U.S. Pat. No. 6,952,265 are incorporated herein by reference, and then measuring appearance characteristics by one or more of the methods described above. It is understood that appearance characteristics of known flakes stored in the flake database need to be generated with the same as or compatible with the aforementioned imaging and measurement methods.

The appearance data of the target coating wherein said appearance data comprise one or more appearance characteristics generated as described above can be compared to each individual appearance characteristic stored in the flake database. Differences between the appearance data and each individual appearance characteristics stored are herein referred to as "feature distances". A simple sum, a root mean square of sum, a weighted aggregated sum, or other calculated sum of feature distances can then be generated. It is well understood by those skilled in the art that different weighing factor(s) can be given to each feature, feature value or feature distance to produce optimized color and/or appearance match. Calculation considerations, weighing factors and algorithms are described in detail in aforementioned U.S. Pat. No. 6,952,265, herein incorporated by reference. Results of the comparisons are ranked based on selected sum of feature distances. The top ranked flake, flake combination or flake ratio can be automatically selected as the best match and then entered into well developed color matching algorithms to produce one or more matching formulas for matching both color and appearance of the target coating.

Color data of the target coating can be obtained by measuring reflectances of the target coating using a color measurement device, such as a colorimeter, a spectrophotometer, or a goniospectrophotometer. Any suitable colorimeter or spectrophotometer, such as Model SP64 manufactured by X-Rite, Grandville, Mich. can be used. Portable spectrophotometers are preferred as they can be readily positioned over coated substrate surfaces of various shapes and sizes. If desired one can measure the reflectances over several portions of the target coating to average out the reflectances of the target coating. Spectral reflectance data can be obtained using spectrophotometer. In a typical spectrophotometer, a light beam of known intensity can be directed towards the target coating and reflectance from the target coating is sequentially measured at at least one, preferably at two, even more preferably at three, aspecular angles at preset wavelengths. Alternatively, a light beam of known intensity can be sequentially directed at at least one, preferably at two, even more preferably at three, incident angles towards the target coating and reflectance from the target coating is then measured at preset wavelengths with a single detecting device so as to provide measurements at different aspecular angles, depending on the angle of illumination. A goniospectrophotometer is a spectrophotometer having the capability of measuring with a variety of illuminating and viewing angles using bidirectional geometry. A goniospectrophotometer is also known as multi-angle spectrophotometer. Any suitable Goniospectrophotometers, such as Model MA68II from X-Rite, Grandville, Mich., or the ones provided by Murakami Color Research Laboratory, Tokyo, Japan, or by IsoColor Inc., Carlstadt, N.J., USA, can be used. Gonioapparent colors should be measured at multiple angles, preferably 3 to 5. For solid colors, a single aspecular angle is sufficient, typically 45 degrees. A common practice for solid colors is to illuminate at a single angle and measure the diffuse reflectance using an integrating sphere, capturing the light reflected at all angles from the target coating. The reverse method of illuminating diffusely and measuring at a single angle yields equivalent results. Diffuse reflectance is preferred when the target coating has a textured surface.

Typically measurements are taken at 10 nm wavelength intervals from 400 nm to 700 nm wavelengths. A plot of the percent reflectance as a function of wavelength is referred to as a "spectral curve" or spectral reflectance data. For a solid color (non-flake or non-gonioapparent color, such as that lacking metallic flakes), only one spectral curve is typically sufficient to measure solid color properties. Other common geometries of measurement are diffuse illumination with 0° or 8° viewing or the reverse. If a target coating having flakes, i.e., gonioapparent color was being matched, reflectance measurements at additional angles would be necessary. ASTM E-2194 recommends three angles, 15°, 45°, and 110° as measured away from the specular reflection. DIN 6175-2 recommends up to five angles, all within this same range of angles. The X-Rite MA68II can provide measurements at 15°, 25°, 45°, 75°, and 110°. The measurement data or spectral reflectance data can be converted into L*, a*, b* or L, C, h values as described in detail in aforementioned U.S. Patent publication No. 2006/0181707, herein incorporated by reference.

Color data may include spectral characteristics such as chroma, hue, lightness, darkness, and the like. Color data may further include a color code of a vehicle, a vehicle identification number (VIN) of a vehicle, a part of the VIN, or a combination thereof.

Color data of the target coating obtained as described above can be compared with color characteristics stored in a color database to select one or more colorant combinations of known colorants, wherein said colorant combinations have color characteristics matching said color data via methods well known to those who are skilled in the art. One example of such well known method is described in detail in aforementioned U.S. Patent publication No. 2006/0181707.

Color data of a target coating can also be obtained from a color code, a vehicle identification number (VIN) of a vehicle, a part of the VIN, or a combination thereof, if the target coating is a vehicle OEM coating. Many paint suppliers, especially vehicle refinish paint suppliers, often produce match coatings that match an original coating of a vehicle (OEM coating) and the match coatings are usually associated with a color code of the OEM coating, a vehicle identification number or a part of the VIN of the vehicle. Methods for matching coating color of a vehicle based on color code or a VIN are well known. One example of using a VIN and a color code to match color of a target coating was disclosed in European patent application EP 1139234. When a color code, a VIN or a combination of a color code and a VIN is used, a number of colorant combinations can be retrieved from a coating database that have colorant combinations associated with the color code, the VIN, part of the VIN, or a combination thereof.

One of the ways of determining concentrations of colorants in the presence of flakes is provided in claim 8 and also at Column 9, line 55-column 10, line 61 and column 18, line 9-column 28, line 5 in the U.S. Pat. No. 5,231,472. Yet another model for gonioapparent colors is discussed in Kettler, W. H., Kolb, M., "Numerical evaluation of optical single-scattering properties of reflective pigments using multiple-scattering inverse transport methods", Die Farbe, Vol. 43, pg. 167 (1997) and Kettler, W. H., Kolb, M., "Inverse multiple scattering calculations for plane-parallel turbid media: application to color recipe formulation", in Proceedings of the International Workshop, Electromagnetic Light Scattering, Theory and Application, Lomonosov State University, Moscow, Edited by Y. Eremin and Th. Wriedt (1997). The foregoing references are incorporated herein by reference.

It is understood by those skilled in the art that color data and appearance data of the target coating must be in compatible forms with color characteristics and appearance characteristics stored in the coating database. For example, if the color data of the target coating are L*,a*,b* data, then the color characteristics stored in the coating database must be compatible with L*,a*,b* data; and if the appearance data of the target coating are from a fixed illumination angle with multiple intensities, appearance characteristics stored in the coating database should also be of same or compatible data. It is also understood by those skilled in the art that some data forms may be converted or interchanged, such as that spectral reflectance data can be converted to L*,a*,b* data.

This invention is further directed to a system for automatic selection of match flakes for producing one or more matching formulas for matching color and appearance of a target coating containing flakes.

Figure 10A:
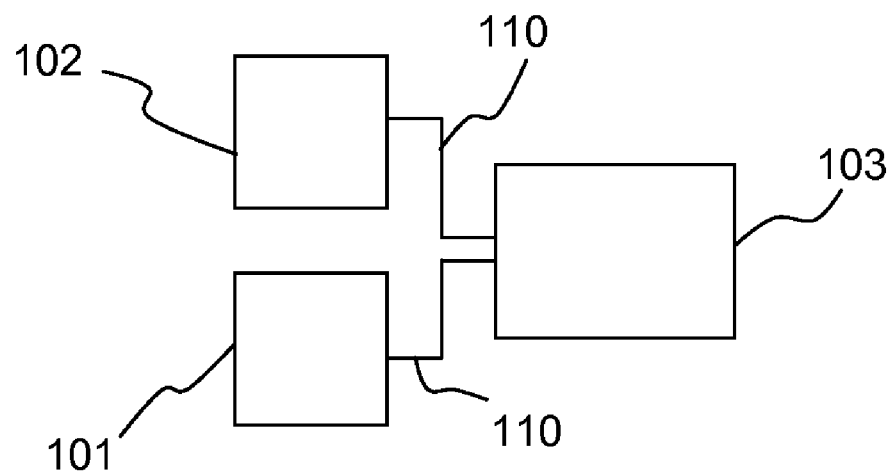
FIG. 10 shows representations of examples of the system: (A) a system having a color measurement device, an appearance measurement device and a computing device; (B) a system having the color measurement device and the imaging device configured in one housing unit; (C) a system configured to obtain color data and target images from a same portion of a target coating; and (D) a system configured to obtain color data and target images from different portions of a target coating.

One embodiment of such system comprises: a) a color measurement device (101) (FIG. 10A) for obtaining color data of the target coating; b) an appearance measurement device (102) for obtaining appearance data of the target coating; c) a computing device (103) comprising a processor and a memory member; d) a color database containing known colorants associated with color characteristics, wherein the color database is accessible from the computing device; e) a flake database containing known flakes associated with appearance characteristics, wherein the flake database is accessible from the computing device; and f) one or more computing program products operatively residing in the memory member that causes the computing device to perform a computing process comprising the steps of: i) receiving said color data and said appearance data; ii) comparing the appearance data to appearance characteristics of known flakes stored in the flake database; iii) selecting from the flake database, one or more match flakes, flake combinations or flake ratios that have appearance characteristics matching the appearance data; iv) selecting from the color database, one or more colorant combinations of known colorants, wherein said colorant combinations have color characteristics matching said color data; v) determining colorant concentrations of each known colorant of said colorant combinations and flake concentrations of each of the match flakes, flake combinations or flake ratios; vi) producing said one or more matching formulas according to said colorant concentrations and said flake concentrations, and optionally balancing said colorant concentrations and said flake concentrations to allow for the presence of non-colorant and non-flake components, wherein match coatings resulted from said matching formulas have color characteristics matching the color data and appearance characteristics matching the appearance data.

Figure 10B:
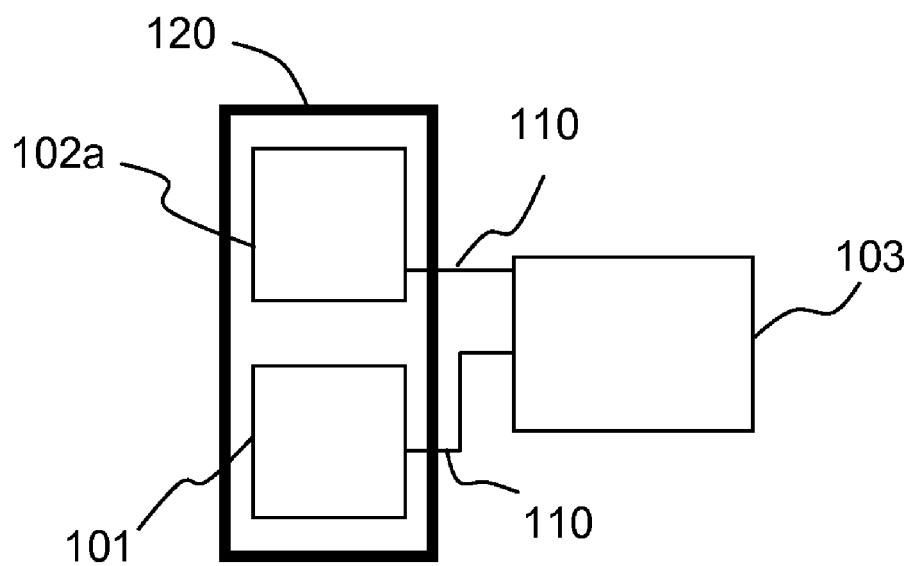

Another embodiment of such system comprises: a) a color measurement device (101) (FIG. 10B) for obtaining color data of the target coating; b) an imaging device (102a) for obtaining one or more target images of the target coating; c) a computing device (103) comprising a processor and a memory member; d) a color database containing known colorants associated with color characteristics, wherein the color database is accessible from the computing device; e) a flake database containing known flakes associated with appearance characteristics, wherein the flake database is accessible from the computing device; and f) one or more computing program products operatively residing in the memory member that causes the computing device to perform a computing process comprising the steps of: i) receiving the color data and the target images; ii) measuring appearance characteristics of the target coating from said target images to generate appearance data; iii) comparing the appearance data to appearance characteristics of known flakes stored in the flake database; iv) selecting from the flake database, one or more match flakes, flake combinations or flake ratios that have appearance characteristics matching the appearance data; v) selecting from the color database, one or more colorant combinations of known colorants, wherein said colorant combinations have color characteristics matching said color data; vi) determining colorant concentrations of each known colorant of said colorant combinations and flake concentrations of each of the match flakes, flake combinations or flake ratios; vii) producing said one or more matching formulas according to said colorant concentrations and said flake concentrations, and optionally balancing said colorant concentrations and said flake concentrations to compensate for the presence of non-colorant and non-flake components, wherein match coatings resulted from said matching formulas have color characteristics matching the color data and appearance characteristics matching the appearance data.

The color measurement device, the appearance measurement device and the imaging device can further comprise means for providing illuminations, means for modulating and selecting illumination intensities, means for modulating illumination angles, or a combination thereof.

The means for providing illuminations typically include a light source, such as, the IT3900 with a tungsten-halogen lamp EKE supplied by Illumination Technologies Inc., East Syracuse, N.Y. and a fiber optic bundle A08025.60 supplied by Schott Fostec Inc., Auburn, N.Y. that is capable of producing beams of illumination in the visible light range of from 400 nanometers to 700 nanometers at set intensities. The system, which is preferably portable, is preferably provided with an enclosed extension to house the light source. However, applicants also contemplate using alternative means, such as the MHF-C50LR light source with an LM-50 lamp and a fiber optic bundle connected to a MML4-45D micro machine lens system, supplied by Moritex USA Inc., San Jose, Calif. to pipe-in the illumination beams from the light source. The means for selecting an effective illumination intensity can be any conventional means, such as a voltage regulator that can change the current to the filament of the light source. The illumination intensity can be controlled in accordance with a conventional software program run from a computer to achieve the preset intensities. The computer used here to control the illumination intensity can be the same aforementioned computing device for receiving the image or a separate computer. Any suitable computer can be used, such as, for example, Dell Precision M50 model supplied by Dell Computer Corp., Round Rock, Tex. If desired, the system may comprise additional means such as a collimating lens or an aperture, for collimating the one or more beams of light emanating from light source as determined necessary by those skilled in the art. The imaging device is preferably a digital imager such as a digital still camera, a digital video camera, a digital scanner, or a charge couple device (CCD) camera.

Figure 10C:
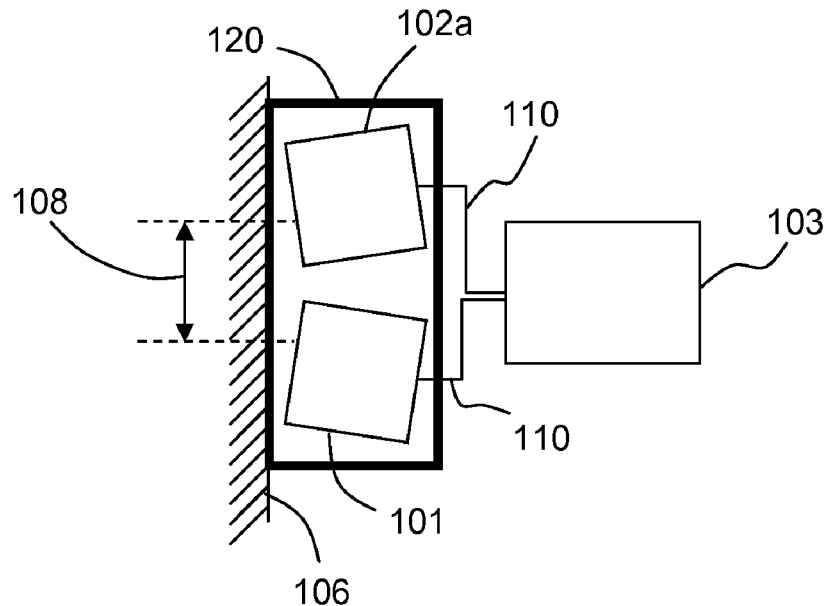
Figure 10D:
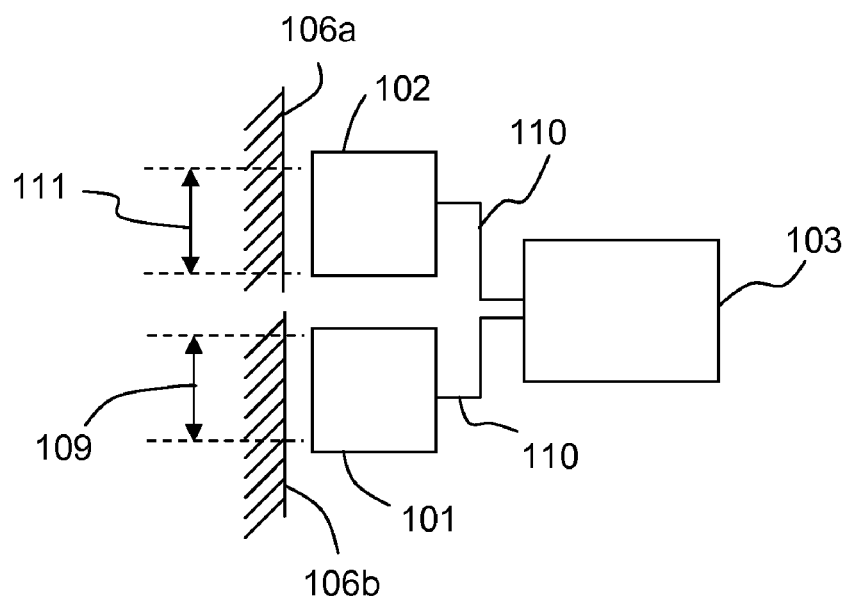

The methods and the systems of this invention, wherein the color measurement device and the imaging device are configured in one housing unit (120) (FIG. 10B and FIG. 10C) or wherein the color measurement device and the imaging device are configured in separate housing units (FIG. 10A and FIG. 10D), can be used for measuring appearances of original automotive coatings (OEM coatings) and for matching the OEM coatings in repair and refinish of such OEM coatings.

Color data or appearance data of a target coating can be obtained at the same portion (108) (FIG. 10C) or at different portions (109 and 111) (FIG. 10D) of the target coating (106). Different portions of the target coating include different portions from a same piece of a substrate coated with the target coating and from different pieces of substrates coated with the same target coating (106a and 106b). For example, color data or appearance data can be obtained from different vehicles of the same model, same manufacturing year, and coated with the same coating. In another example, color data or appearance data can be obtained from different target panels coated with the same target coating.

Some or all of aforementioned color measurement devices and imaging devices can be modified or reconfigured by those skilled in the art to be integrated with a computing device or to have a built-in computing device unit capable of processing and recording color or appearance data without transferring color data or images to a separate computing device.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Example 1

A car part from a Honda Pilot vehicle coated with Steel Blue Paint had a coating damage and was used for coating repair. The car part was a cut-off metal from the vehicle body. The paint color code for the Steel Blue Paint of the vehicle was B533M. The car part was imaged with two preset illumination intensities at a fixed illumination angle, perpendicular (0°) to the surface of the coated area to generate coating images. Each image was measured at one high and one low threshold levels to generate appearance data of the vehicle coating.

By comparing the appearance data with appearance characteristics of known flakes in benchmarking coatings stored in a flake database, a 25/75 blend of 2 aluminum flakes was selected. Among the 2 aluminum flakes, one was a coarse flake 814J and the other was a fine bright aluminum flake 819J.

Color of the vehicle was measured with a goniospectrophotometer Model MA68II, manufactured by X-Rite, Grandville, Mich.

The color data and the selection of 25/75 blend of 2 aluminum flakes were entered into traditional automated formulation algorithm, as described by Kettler, W. H., Kolb, M., in "Inverse multiple scattering calculations for plane-parallel turbid media: application to color recipe formulation", in Proceedings of the International Workshop, Electromagnetic Light Scattering, Theory and Application, Lomonosov State University, Moscow, Edited by Y. Eremin and Th. Wriedt (1997). The following matching formula was produced automatically.

TABLE 1

| Toners | Percent by Weight |
|---|---|
| White Toner 801J[1] | 1.04 |
| Black Toner 805J[2] | 7.90 |
| Additive 4530S[3] | 1.24 |
| Red Toner 862J[4] | 2.84 |
| Blue Toner 827J[5] | 11.38 |
| Coarse aluminum flake 814J[6] | 1.10 |
| Fine bright aluminum 819J[7] | 3.32 |
| Binder 150K[8] | 44.90 |
| Binder 175K[8] | 26.30 |

Note
[1-8]Toners, aluminum flakes and binders are available from E.I. du Pont de Nemours and Company, Wilmington, DE, USA.

A coating composition was prepared based on the formula and used to repair the coating damage according to well known coating repair process.

If necessary, the formula can be adjusted based on standard color adjustment process.

Example 2

A Honda Pilot vehicle coated with Steel Blue Paint has a coating damage and is in need for coating repair. The vehicle has a paint color code B533M. A coated area of the vehicle adjacent to the damaged coating is imaged with two preset illumination intensities at a fixed illumination angle, perpendicular (0°) to the surface of the coated area to generate coating images. Each image is measured at one high and one low threshold levels to generate appearance data of the vehicle coating.

The coating images are measured with the same process and flakes are selected to produce matching formulas as described in Example 1. The coating damage is repaired as described in Example 1.

Comparative Example

The same car part as in Example 1 was analyzed using conventional visual effect pigment identification techniques by an experienced shader. The shader selected a 90/10 blend of 2 aluminum flakes, one being a fine bright type and the other being a medium aluminum. Color data were obtained using the same spectrophotometer. When the 90/10 blend was combined with the color data, using the same traditional automated formulation algorithm, a color formula was produced. However, a coating prepared based on the color formula did not provide acceptable appearance match.

Flake types and combinations were manually adjusted and coating compositions were prepared and tested repeatedly until acceptable match in both color and appearance were achieved.

What is claimed is:

1. A method for producing one or more matching formulas for matching color and appearance of a target coating containing flakes, said method comprising the steps of:
    a) obtaining appearance data of the target coating;
    b) comparing the appearance data with appearance characteristics of known flakes stored in a flake database;
    c) selecting from said flake database, one or more matched flakes, flake combinations or flake ratios that have appearance characteristics matching said appearance data;
    d) obtaining color data of the target coating;
    e) comparing said color data with color characteristics of one or more colorant combinations of known colorants stored in a color database to select from said color database, one or more colorant combinations that have color characteristics matching said color data;

f) determining colorant concentrations of each said known colorant of said colorant combinations and said flake concentrations of each of the match flakes, the flake combinations or the flake ratios;

g) producing said one or more matching formulas according to said colorant concentrations and said flake concentrations, wherein match coatings resulted from said matching formulas have color characteristics matching the color data and appearance characteristics matching the appearance data; and wherein the step a) comprises:
i) obtaining one or more target images of the target coating at at least one pre-set illumination intensity using an imaging device; and
ii) generating appearance data by measuring characteristics of the target coating from said target images;

wherein said appearance data comprise appearance features comprising a set of bright features from bright areas of said target image having image intensity level equal to or greater than a first threshold level, a set of intermediate features from intermediate areas of the target image having image intensity level equal to or greater than a second threshold level, and a set of dark features, wherein pixels or regions of pixels from dark areas of the target image having image intensity below a third threshold level where the target coating is essentially free of detectable objects are identified as said dark features;

wherein said third threshold level is lower than said first and said second threshold levels.

2. The method of claim 1, wherein the imaging device is a digital imager.

3. The method of claim 1, wherein the step d) comprises:
i) obtaining reflectance data of the target coating using a color measuring device; and
ii) generating color data based on the reflectance data.

4. The method of claim 3, wherein the reflectance data is obtained by measuring reflectance of the target coating at one or more detection angles at a fixed illumination intensity, a fixed illumination angle and a preset illumination wavelength.

5. The method of claim 3, wherein the reflectance data is obtained by measuring reflectance of the target coating at a fixed detection angle at one or more illumination intensities, at one or more illumination angles, and at one or more illumination wavelengths.

6. The method of claim 1, wherein the color data comprise $L^*, a^*, b^*$ or $L, C, h$ values.

7. The method of claim 1, wherein the color data comprise spectral reflectance data.

8. The method of claim 1, wherein the color data comprise a color identification code selected from a color code of a vehicle, a vehicle identification number (VIN) of the vehicle, a portion of the VIN, or a combination thereof.

9. The method of claim 1, wherein the flakes are gonioapparent flakes.

10. The method of claim 1, wherein the target coating is affixed to surface of an automotive body.

11. The method of claim 1 further comprising the step of balancing said colorant concentrations and said flake concentrations to compensate for the presence of non-colorant and non-flake components.

12. A system for producing one or more matching formulas for matching color and appearance of a target coating containing flakes, said system comprising:
a) a color measurement device (101) for obtaining color data of the target coating;
b) an appearance measurement device (102) for obtaining appearance data of the target coating;
c) a computing device (103) comprising a processor and a memory member;
d) a color database containing known colorants associated with color characteristics, wherein the color database is accessible from the computing device;
e) a flake database containing known flakes associated with appearance characteristics, wherein the flake database is accessible from the computing device; and
f) one or more computing program products operatively residing in the memory member that causes the computing device to perform a computing process comprising the steps of:
i) receiving said color data and said appearance data;
ii) comparing the appearance data to appearance characteristics of known flakes stored in the flake database;
iii) selecting from the flake database, one or more match flakes, flake combinations or flake ratios that have appearance characteristics matching the appearance data;
iv) selecting from the color database, one or more colorant combinations of known colorants, wherein said colorant combinations have color characteristics matching said color data;
v) determining colorant concentrations of each known colorant of said colorant combinations and flake concentrations of each of the match flakes, flake combinations or flake ratios;
vi) producing said one or more matching formulas according to said colorant concentrations and said flake concentrations, wherein match coatings resulted from said matching formulas have color characteristics matching the color data and appearance characteristics matching the appearance data;

wherein said appearance data in the step b) is obtained by a process comprising the steps of:
obtaining one or more target images of the target coating at at least one pre-set illumination intensity using an imaging device; and
generating said appearance data by measuring characteristics of the target coating from said target images; and wherein said appearance data comprise appearance features comprising a set of bright features from bright areas of said target image having image intensity level equal to or greater than a first threshold level, a set of intermediate features from intermediate areas of the target image having image intensity level equal to or greater than a second threshold level, and a set of dark features, wherein pixels or regions of pixels from dark areas of the target image having image intensity below a third threshold level where the target coating is essentially free of detectable objects are identified as said dark features;

wherein said third threshold level is lower than said first and said second threshold levels.

13. The system of claim 12, wherein the color measurement device is a colorimeter, spectrophotometer, or a goniospectrophotometer.

14. The system of claim 12, wherein the color data comprise L*, a*, b* or L, C, h values.

15. The system of claim 12, wherein the color data comprise spectral reflectance data.

16. The system of claim 12, wherein the color data comprise a color identification code selected from a color code of a vehicle, a vehicle identification number (VIN) of the vehicle, a part of the VIN, or a combination thereof.

17. The system of claim 12, wherein the flakes are gonioapparent flakes.

18. The system of claim 12, wherein the target coating is affixed to surface of an automotive body.

19. The system of claim 12, wherein the computing process further comprises the step of balancing said colorant concentrations and said flake concentrations to compensate for the presence of non-colorant and non-flake components.

20. A system for producing one or more matching formulas for matching color and appearance of a target coating containing flakes, said system comprising:
    a) a color measurement device (101) for obtaining color data of the target coating;
    b) an imaging device (102a) for obtaining one or more target images of the target coating;
    c) a computing device (103) comprising a processor and a memory member;
    d) a color database containing known colorants associated with color characteristics, wherein the color database is accessible from the computing device;
    e) a flake database containing known flakes associated with appearance characteristics, wherein the flake database is accessible from the computing device; and
    f) one or more computing program products operatively residing in the memory member that causes the computing device to perform a computing process comprising the steps of:
        i) receiving the color data and the target images;
        ii) measuring appearance characteristics of the target coating from said target images to generate appearance data;
        iii) comparing the appearance data to appearance characteristics of known flakes stored in the flake database;
        iv) selecting from the flake database, one or more match flakes, flake combinations or flake ratios that have appearance characteristics matching the appearance data;
        v) selecting from the color database, one or more colorant combinations of known colorants, wherein said colorant combinations have color characteristics matching said color data;
        vi) determining colorant concentrations of each known colorant of said colorant combinations and flake concentrations of each of the match flakes, flake combinations or flake ratios;
        vii) producing said one or more matching formulas according to said colorant concentrations and said flake concentrations, wherein matching coating resulted from said matching formulas have color characteristics matching the color data and appearance characteristics matching the appearance data; and
    wherein said appearance data comprise appearance features comprising a set of bright features from bright areas of said target image having image intensity level equal to or greater than a first threshold level, a set of intermediate features from intermediate areas of the target image having image intensity level equal to or greater than a second threshold level, and a set of dark features, wherein pixels or regions of pixels from dark areas of the target image having image intensity below a third threshold level where the target coating is essentially free of detectable objects are identified as said dark features;
    wherein said third threshold level is lower than said first and said second threshold levels.

21. The system of claim 20, wherein the color measurement device is a colorimeter, spectrophotometer, or a goniospectrophotometer.

22. The system of claim 20, wherein the color data comprise L*, a*, b* or L, C, h values.

23. The system of claim 20, wherein the color data comprise spectral reflectance data.

24. The system of claim 20, wherein the color data comprise a color identification code selected from a color code of a vehicle, a vehicle identification number (VIN) of the vehicle, a part of the VIN, or a combination thereof.

25. The system of claim 20, wherein the imaging device is a digital imager.

26. The system of claim 20, wherein the flakes are gonioapparent flakes.

27. The system of claim 20, wherein the target coating is affixed to surface of an automotive body.

28. The system of claim 20, wherein the imaging device comprises means for modulating illumination intensities.

29. The system of claim 20, wherein the imaging device comprises means for modulating illumination angles.

30. The system of claim 20, wherein the color measurement device comprises means for modulating illumination angles.

31. The system of claim 20, wherein the color measurement device comprises means for modulating illumination intensities.

32. The system of claim 20 further comprising a third database for storing and retrieving said color data and said appearance data, wherein the third database is accessible from the computing device.

33. The system of claim 20, wherein the color measurement device is operatively coupled to the computing device via wired or wireless connections (110).

34. The system of claim 20, wherein the imaging device is operatively coupled to the computing device via wired or wireless connections (110).

35. The system of claim 20, wherein the color measurement device and the imaging device are configured in one housing unit.

36. The system of claim 20, wherein the color measurement device and the imaging device are configured in separate housing units.

37. The system of claim 20, wherein the color measurement device and the imaging device are configured to obtain said color data and said target images from a same portion of the target coating simultaneously or sequentially.

38. The system of claim 20, wherein the color measurement device and the imaging device are configured to obtain said color data and said target images from different portions of the target coating simultaneously or sequentially.

39. The system of claim 20, wherein the computing device is a portable computing device.

40. The system of claim 39, wherein the portable computing device is operatively coupled to the color measurement device or the imaging device via wireless connections.

41. The system of any one of claims 20-40, wherein the color measurement device and the imaging device are configured to obtain said color data and said target images from a same portion of the target coating simultaneously or sequentially.

42. The system of any one of claims 20-40, wherein the color measurement device and the imaging device are configured to obtain said color data and said target images from different portions of the target coating simultaneously or sequentially.

* * * * *